(12) United States Patent
Laukli et al.

(10) Patent No.: US 8,486,470 B2
(45) Date of Patent: Jul. 16, 2013

(54) READY-TO-EAT FOOD PRODUCT

(75) Inventors: Amy C. Ireland Laukli, Yarmouth, ME (US); Bjorn A. Laukli, Yarmouth, ME (US)

(73) Assignee: Neu Naturals, LLC, Yarmouth, ME (US)

( * ) Notice: Subject to any disclaimer, the term of this patent is extended or adjusted under 35 U.S.C. 154(b) by 169 days.

(21) Appl. No.: 12/894,671

(22) Filed: Sep. 30, 2010

(65) Prior Publication Data

US 2012/0082763 A1 Apr. 5, 2012

(51) Int. Cl.
*A23L 1/212* (2006.01)

(52) U.S. Cl.
USPC ........... 426/102; 426/601; 426/615; 426/656; 426/660

(58) Field of Classification Search
USPC .......................... 426/615, 102, 656, 660, 601
See application file for complete search history.

(56) References Cited

U.S. PATENT DOCUMENTS

| | | |
|---|---|---|
| 2,181,109 A | 11/1939 | Dodge |
| 4,086,367 A | 4/1978 | Ziccarelli |
| 4,539,211 A | 9/1985 | Armando et al. |
| 4,568,557 A | 2/1986 | Becker et al. |
| 4,596,714 A | 6/1986 | Brabbs |
| 4,673,578 A | 6/1987 | Becker et al. |
| 4,743,457 A | 5/1988 | Wissgott et al. |
| 4,784,867 A | 11/1988 | LaBaw et al. |
| 4,888,187 A | 12/1989 | Given, Jr. et al. |
| 4,889,730 A | 12/1989 | Roberts et al. |
| 4,961,943 A * | 10/1990 | Blanthorn et al. ............ 426/102 |
| D329,934 S | 10/1992 | Dywan |
| 5,364,653 A | 11/1994 | Nakayama |
| 5,554,406 A | 9/1996 | Muenz et al. |
| 5,718,931 A | 2/1998 | Walter et al. |
| 5,840,354 A | 11/1998 | Baumann et al. |
| 6,033,696 A | 3/2000 | Aebischer et al. |
| D440,378 S | 4/2001 | Malfait |
| D463,088 S | 9/2002 | Evitts et al. |
| 6,500,474 B2 * | 12/2002 | Cross et al. ..................... 426/93 |
| 6,579,555 B1 | 6/2003 | Weinstein et al. |
| 6,676,982 B2 | 1/2004 | Mody |
| 6,716,462 B2 | 4/2004 | Prosise et al. |
| 6,777,016 B2 | 8/2004 | Thresher |

(Continued)

FOREIGN PATENT DOCUMENTS

| | | |
|---|---|---|
| BE | 902444 | 5/1985 |
| EP | 1470759 | 10/2004 |
| JP | 3247254 | 11/1991 |

OTHER PUBLICATIONS

Fruitified ZonePerfect Nutrition Bars; Abbott Nutrition; http://abbottnutrition.com/Products/fruitified-zoneperfect-nutrition-bars; 2010.

(Continued)

*Primary Examiner* — Helen F Heggestad
(74) *Attorney, Agent, or Firm* — Pierce Atwood LLP

(57) ABSTRACT

A ready-to-eat food product includes a fruit core and a barrier coating covering the fruit core. The barrier coating can be a solid or semi-solid up to substantially 41 degrees Celsius. The ready-to-eat food product further includes an outer protective coating distributed around the barrier coating. The outer protective coating can include a plurality of dry particles separating an outer surface of the outer protective coating and an outer surface of the barrier coating.

26 Claims, 5 Drawing Sheets

U.S. PATENT DOCUMENTS

| | | | |
|---|---|---|---|
| 6,846,501 | B2 | 1/2005 | Prosise et al. |
| 6,951,661 | B2 | 10/2005 | Roy et al. |
| 7,022,356 | B2 | 4/2006 | Schmidt |
| 7,220,442 | B2 | 5/2007 | Gautam et al. |
| 7,297,357 | B2 | 11/2007 | Akimoto et al. |
| 7,329,429 | B2 | 2/2008 | Chimel et al. |
| D572,427 | S | 7/2008 | Green et al. |
| D574,577 | S | 8/2008 | Green et al. |
| 7,431,955 | B2 | 10/2008 | Froseth et al. |
| 7,569,244 | B2 | 8/2009 | Jordan |
| 7,601,370 | B2 | 10/2009 | Johnson |
| D616,176 | S | 5/2010 | Lee |
| 2004/0067282 | A1 | 4/2004 | Karwowski et al. |
| 2004/0166206 | A1 | 8/2004 | Archibald et al. |
| 2004/0234660 | A1 | 11/2004 | Bauman et al. |
| 2005/0181019 | A1 | 8/2005 | Palmer et al. |
| 2005/0191406 | A1 | 9/2005 | Alexander et al. |
| 2005/0226960 | A1 | 10/2005 | Boice et al. |
| 2005/0249868 | A1 | 11/2005 | Schmidt |
| 2006/0045937 | A1 | 3/2006 | Slesinski et al. |
| 2006/0068062 | A1 | 3/2006 | Newman et al. |
| 2006/0099277 | A1 | 5/2006 | Jewett et al. |
| 2007/0014914 | A1 | 1/2007 | Borders et al. |
| 2007/0087084 | A1 | 4/2007 | Coleman et al. |
| 2007/0122529 | A1 | 5/2007 | Thai et al. |
| 2007/0141213 | A1 | 6/2007 | Wang |
| 2007/0231450 | A1 | 10/2007 | Coleman et al. |
| 2008/0063748 | A1 | 3/2008 | Massey et al. |
| 2008/0199564 | A1 | 8/2008 | Boghani et al. |
| 2008/0199571 | A1 | 8/2008 | Arsan et al. |
| 2008/0206424 | A1 | 8/2008 | Villagran |
| 2008/0241319 | A1 | 10/2008 | Pandey et al. |
| 2008/0317891 | A1 | 12/2008 | Anderson et al. |
| 2009/0081337 | A1 | 3/2009 | Amiri |
| 2009/0208607 | A1 | 8/2009 | Bunke et al. |
| 2010/0055263 | A1 | 3/2010 | Erle et al. |
| 2010/0098829 | A1 | 4/2010 | Anand et al. |
| 2010/0136153 | A1 | 6/2010 | Caballero et al. |
| 2010/0166914 | A1 * | 7/2010 | Herron et al. .................. 426/61 |

OTHER PUBLICATIONS

Healthy Green Kitchen; Homemade Protein Bars; http://blog.healthy-gree-lifestyle.com/homemade-protein-bars.html; May 28, 2009.

Berry Chocolatey Energy Bar (Raw Vegan); http://jugalbandi.info/2009/08/berry-chocolatey-energy-bar-raw-vegan/; Aug. 17, 2009.

BellyBar Food & Drinks: Made Just for You; Nutrition Information; http://www.nutrabella.com/foods/nut_info.html; 2005-2010.

PowerBar Harvest Energy Bar Oatmeal Raisin; http://www.powerbar.com/products/25/powerbar-harvest.aspx, Aug. 25, 2010.

Blueberry ZonePerfect Nutrition Bar; http://zoneperfect.com/products/zoneperfect-fruitified-blueberry; Abbott Laboratories; 2010.

William D. McArdle, Frank L. Katch, Victor L. Katch; Exercise Physiology: Nutrition, Energy, and Human Performance; p. 96; Nov. 13, 2009.

* cited by examiner

READY-TO-EAT FOOD PRODUCT

BACKGROUND

Fruit is generally recognized as an excellent source of nutritional value in human diets. However limited shelf life can compromise the nutritional value of the fruit, furthermore the fragility of fruit presents usage and storage challenges. A need therefore exists for a fruit-based food product that provides the benefits and nutritional value of fruit in a convenient and practical delivery system.

SUMMARY

Embodiments described herein relate generally to a ready-to-eat food product and a method for preparing a ready-to-eat food product.

One embodiment features a ready-to-eat food product that includes a fruit core. The embodiment also includes a barrier coating covering the fruit core, wherein the barrier coating is a solid or semi-solid up to substantially 41 degrees Celsius. The embodiment also includes an outer protective coating distributed around the barrier coating, wherein the outer protective coating includes a plurality of dry particles separating an outer surface of the outer protective coating and an outer surface of the barrier coating.

In some embodiments, the outer protective coating is distributed around the barrier coating to substantially limit melting of the barrier coating during handling of the food product. In some embodiments, handling includes packaging of the food product, consumption of the food product, shipping of the food product, or any combination thereof.

In some embodiments, the separation of the outer surface of the outer protective coating and the outer surface of the barrier coating forms a gap. In some embodiments, the gap is substantially between 0.1-0.9 centimeters. In some embodiments, the gap is an air gap. In some embodiments, the plurality of dry particles are embedded into the barrier coating.

In some embodiments, the fruit product includes substantially 40-80% fruit core by volume. In some embodiments, the barrier coating creates a barrier around the fruit core to maintain moisture content of the fruit core. In some embodiments, moisture content of the fruit core is substantially 5% to 25%.

In some embodiments, at least one of the fruit core, the barrier coating or the outer protective coating includes a whey protein. In some embodiments, the fruit core is produced from a ground dried fruit, a freeze dried fruit powder, a fruit juice concentrate, water, or any combination thereof.

In some embodiments, the fruit core includes apple, pear, strawberry, blueberry, mango, pineapple, raspberry, kiwi, banana, orange, lemon, grape, cherry, apricots, cranberry, peach, plum, pomegranate, tangerine, or any combination thereof. In some embodiments, the barrier coating includes chocolate, yogurt, peanut butter, nutritionally fortified coating, confectionery coating, flavored confectionery coating, or any combination thereof. In some embodiments, the dry particles include crisps, grains, cereal, nuts, fruit powders, fruit flakes, or any combination thereof.

Another embodiment features a method for preparing a ready-to-eat food product that includes forming a fruit core. The method includes the step of covering the fruit core with a barrier coating, wherein the barrier coating is a solid or semi-solid up to substantially 41 degrees Celsius. The method includes the step of distributing an outer protective coating around the barrier coating, wherein the outer protective coating includes a plurality of dry particles separating an outer surface of the outer protective coating and an outer surface of the barrier coating.

In some embodiments, the method includes mixing a ground dried fruit, a freeze dried fruit powder, a fruit juice concentrate, and water to form a fruit paste. In some embodiments, the method includes extruding the fruit paste to form the fruit core. In some embodiments, the method includes processing the fruit paste to form the fruit core, wherein the processing of the fruit paste includes at least one of slicing, scoring, cutting, chopping, segmenting, or rolling the fruit paste.

In some embodiments, the method includes mixing whey protein into the fruit paste. In some embodiments, the method includes mixing whey protein into the barrier coating. In some embodiments, the method includes mixing whey protein into the outer protective coating. In some embodiments, the method includes heating the barrier coating before the covering of the fruit core. In some embodiments, the method includes insulating the barrier coating from external heat to substantially limit melting of the barrier coating during handling of the food product.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
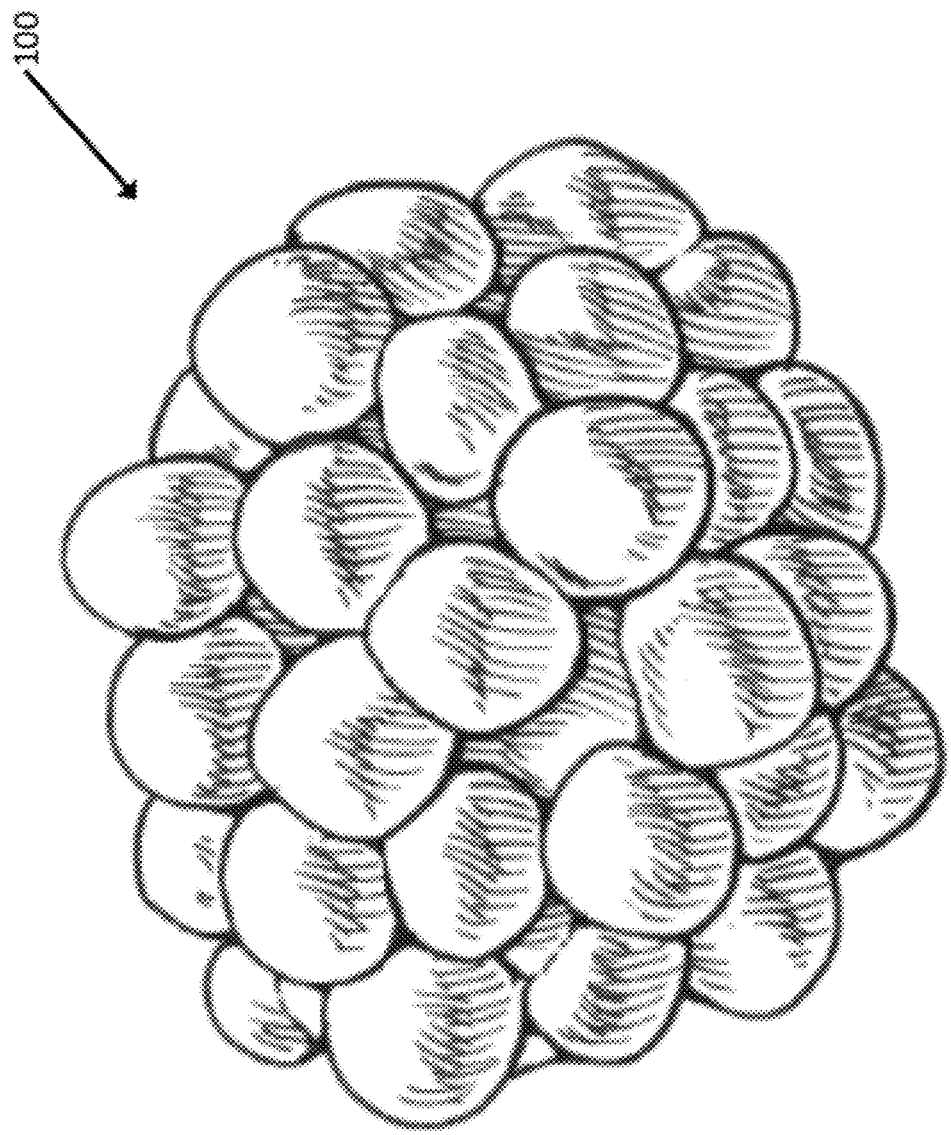
FIG. 1 illustrates a schematic illustration of an exemplary ready-to-eat food product, according to an illustrative embodiment of the invention.

FIG. 1 illustrates a schematic illustration of an exemplary ready-to-eat food product 100, according to an illustrative embodiment of the invention. The food product 100 includes a fruit core (e.g., fruit paste center, fruit piece), a barrier coating (e.g., confection coating, yogurt), and an outer protective coating (e.g., dry outside coating, crisps). The fruit core is located at the center of the food product 100. The fruit core constitutes a majority of the fruit product 100 by volume (e.g., 60%, 75%). The fruit core includes one or more fruit components mixed together to optimize taste, texture, moisture content, nutritional content, and/or shelf life. The barrier coating surrounds the fruit core and inhibits the transfer of moisture into and out of the fruit core, thereby advantageously maintaining the moisture level and nutritional value of the food product 100. The outer protective coating is distributed around the barrier coating and protects the integrity and quality of the food product 100 (e.g., protects the food product 100 in warm temperatures, prevents the barrier coating of individual food products from melting together, protects the food product 100 from melting during handling by the consumer, substantially protects the food product 100 from melting during storage in warm temperatures).

The food product 100 can advantageously include natural ingredients with an optimized combination of carbohydrates and proteins, thereby providing increased health benefits to the consumers of the food product 100 (e.g., providing high protein, providing balanced vitamins, providing complex carbohydrates, providing an optimized mix of carbohydrates and proteins for consumers during exercise activities). The food product 100 can advantageously not be cooked (e.g., fried, baked) during preparation of the food product 100, thereby maintaining the health benefits of the ingredients. The food product 100 can advantageously include protein powder (e.g., whey protein, soy protein, legume protein) added to one or more parts of the food product 100 (e.g., fruit core and barrier coating, fruit core only, barrier coating only), thereby increasing the nutritional value of the food product 100 (e.g., increasing biological value, increasing net protein utilization, increasing protein digestibility, increasing absorption into the consumer's body) without adding engineered ingredients to the food product 100.

Figure 2:
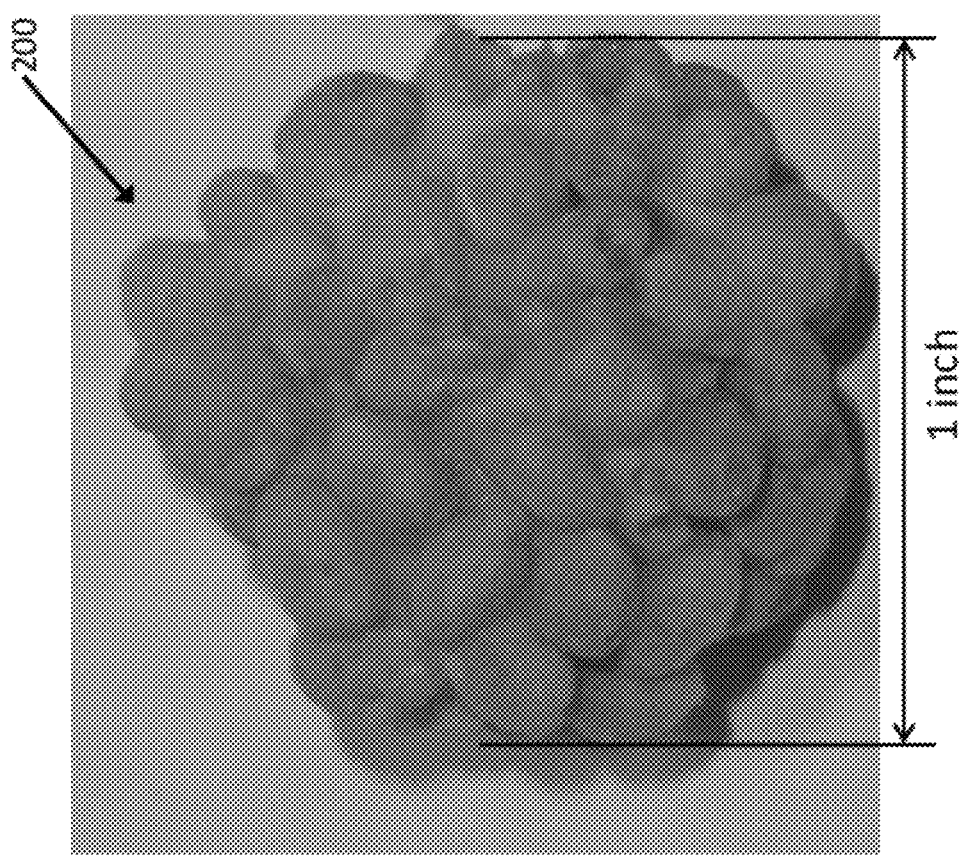
FIG. 2 illustrates a schematic illustration of another exemplary ready-to-eat food product, according to an illustrative embodiment of the invention.

FIG. 2 illustrates a schematic illustration of another exemplary ready-to-eat food product 200, according to an illustrative embodiment of the invention. As illustrated in FIG. 2, the food product 200 is about 1 inch diameter sphere. In other examples, the food product 200 can be any size (e.g., 2 inches by 2 inches, 3 inches by 2 inches) and/or shape (e.g., cube, tetrahedron).

The food product 100 can be bite sized (i.e., able to be eaten in one bite by a consumer), thereby advantageously providing portion control for the consumer and increasing the portability of the food product 100. The fruit core can provide part or all of one serving of fruit for the consumer (e.g., ¼ cup of dried fruit, one apple, one banana), thereby advantageously contributing to the daily nutritional requirements of the consumer.

Figure 3:
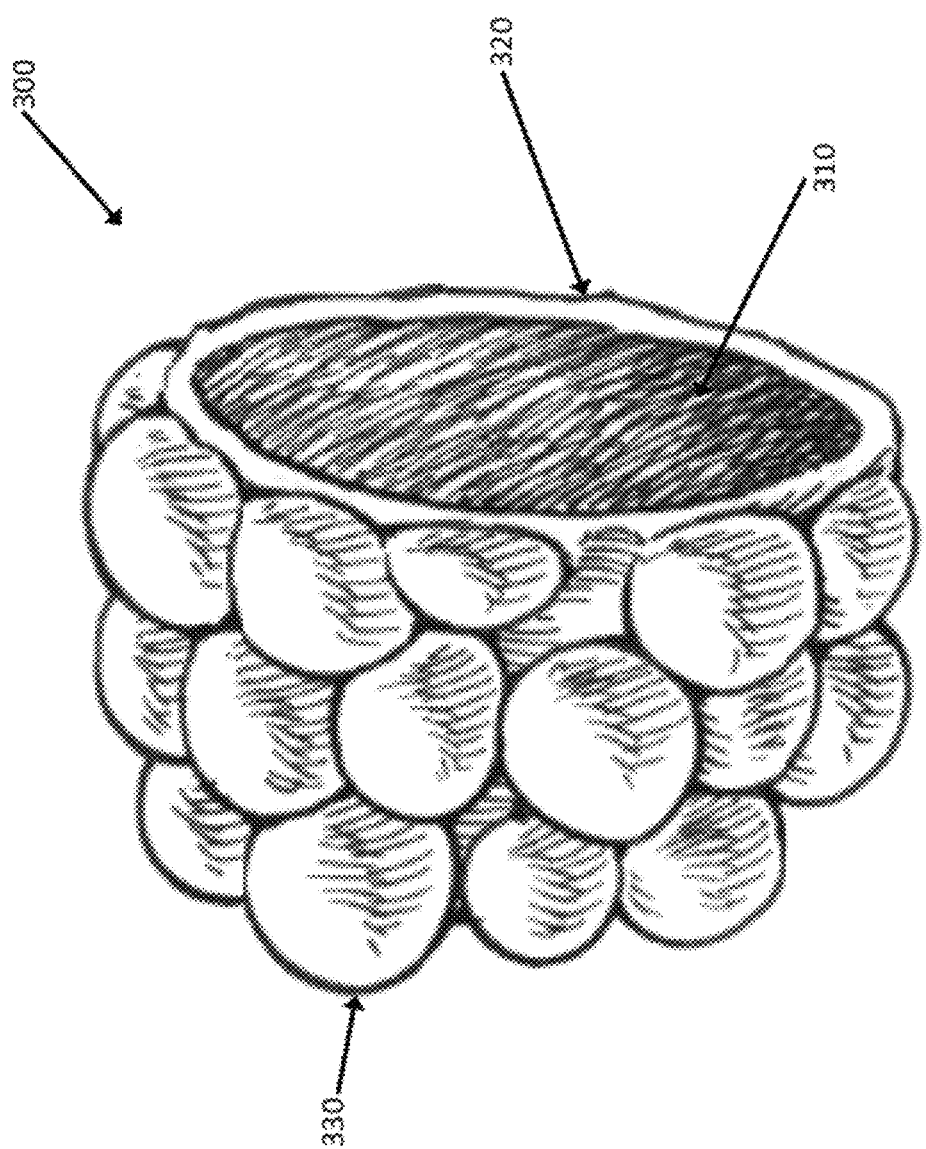
FIG. 3 illustrates a schematic illustration of a cross-sectional view of another exemplary ready-to-eat food product, according to an illustrative embodiment of the invention.

FIG. 3 illustrates a schematic illustration of a cross-sectional view of another exemplary ready-to-eat food product 300, according to an illustrative embodiment of the invention. The food product 300 includes a fruit core 310 (e.g., strawberry filling, blueberry fruit paste, banana gel), a barrier coating 320 (e.g., confectionery coating, yogurt coating), and an outer protective coating 330 (e.g., dried crisps, dried fruit flakes). The barrier coating 320 covers the fruit core 310 (e.g., uniform covering of the fruit core 310, random covering of the fruit core 310, enrobing the fruit core 310, partial covering of the fruit core 310). The outer protective coating 330 is distributed around the barrier coating 320 (e.g., randomly distributed, uniformly distributed).

In some examples, the fruit core 310 is produced from a ground dried fruit, a freeze dried fruit powder, a fruit juice concentrate, and/or water. In other examples, the fruit core includes apple, pear, strawberry, blueberry, mango, pineapple, raspberry, kiwi, banana, orange, lemon, grape, cherry, apricots, cranberry, peach, plum, pomegranate, tangerine, watermelon, cantaloupe, and/or any other type of fruit. Although FIG. 3 illustrates the food product 300 including the fruit core 310, in some examples, the core of the food product 300 includes a vegetable (e.g., corn, peas) and/or any other type of core ingredient.

In other examples, the barrier coating 320 is a solid or semi-solid up to substantially 41 degrees Celsius (105 degrees Fahrenheit) (e.g., 41 degrees Celsius±5 degrees Celsius, 41 degrees Celsius+10 degrees Celsius). In some examples, the barrier coating 320 is a solid or semi-solid substantially between 29 to 35 degrees Celsius (85 to 95 degrees Fahrenheit) (e.g., 29 to 35 degrees Celsius, 28 to 34 degrees Celsius). In other examples, the barrier coating 320 is a solid or semi-solid while being held by a human and/or when stored in a vehicle. The barrier coating 320 advantageously does not melt during handling (e.g., consumption by a consumer, carrying by a consumer, transportation to a store), thereby increasing the useful environments for consumption, storage, and transportation of the food product and decreasing waste due to damage during handling.

In some examples, the barrier coating 320 creates a barrier around the fruit core 310 to maintain moisture content of the fruit core 310. In other examples, the barrier coating 320 includes chocolate, yogurt, peanut butter, nutritionally fortified coating, confectionery coating, flavored confectionery coating, and/or any other type of barrier coating (e.g., gel, syrup, seaweed).

In other examples, the outer protective coating 330 includes a plurality of dry particles (e.g., puffed cereal, cereal, dried seaweed) separating an outer surface of the outer protective coating 330 and an outer surface of the barrier coating 320. In some examples, the outer protective coating 330 is distributed around the barrier coating to substantially limit melting of the barrier coating during handling of the food product (e.g., delays melting by ten minutes, delays melting by two hours). In other examples, the outer protective coating 330 is distributed around the barrier coating to limit melting of the barrier coating during handling of the food product.

In some examples, the dry particles include crisps, grains, nuts, fruit powders, fruit flakes, and/or any other type of dry particle (e.g., candy, processed cereal). In other examples, the handling of the food product 300 includes the process of packaging the food product (e.g., automatic packaging of five food products 300 in a bag, hand packaging of four food products 300 in a bag), consumption of the food product, and/or shipping of the food product. In some examples, the fruit core 310, the barrier coating, and/or the outer protective coating 320 includes a protein (e.g., whey protein, soy protein, legume protein).

In some examples, the fruit product 300 is substantially 40-80% fruit core 310 by volume. In other examples, the fruit product 300 is 40-80% fruit core 310 by volume. In some examples, the fruit product 300 is 40%±5% fruit core 310 by volume. In other examples, the fruit product 300 is 60% fruit core 310 by volume. In some examples, the moisture content of the fruit core 310 is substantially 5% to 25% (e.g., 5% to 25%, 4% to 26%). In other examples, the moisture content of the fruit core 310 is 25%±4%. In other examples, the moisture content of the fruit core 310 is 20%.

Figure 4:
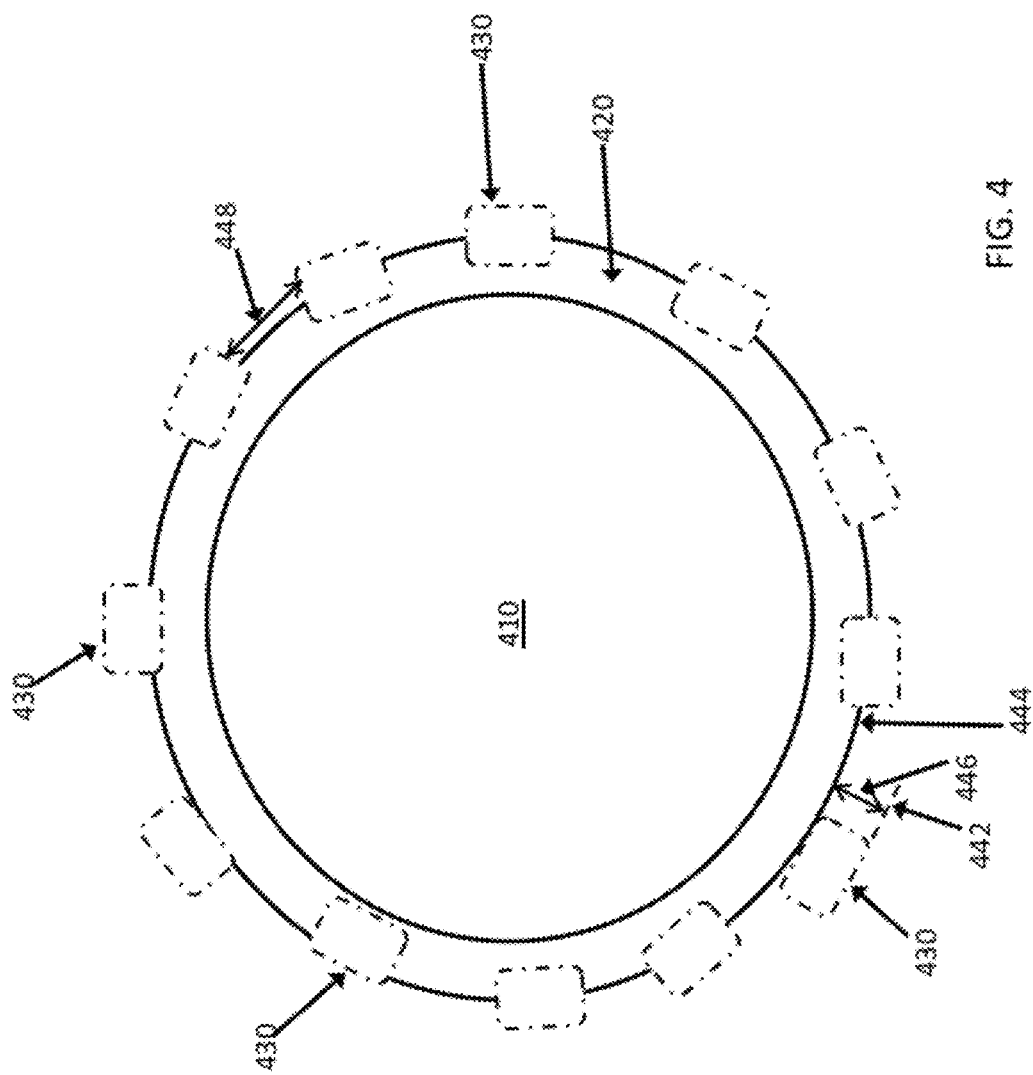
FIG. 4 illustrates a schematic illustration of a cross-sectional view of another exemplary ready-to-eat food product, according to an illustrative embodiment of the invention.

FIG. 4 illustrates a schematic illustration of a cross-sectional view of another exemplary ready-to-eat food product 400, according to an illustrative embodiment of the invention. The food product 400 includes a fruit core 410 (e.g., fruit paste mixture, reconstituted fruit powder), a barrier coating 420 (e.g., vanilla flavored confectionery coating, orange flavored coating), and an outer protective coating 430 (e.g., cereal, puffed pastry). The barrier coating 420 covers the fruit core 410. The outer protective coating 430 is distributed around the barrier coating 420.

As illustrated in FIG. 4, the food product 400 includes a separation 446 between an outer surface 444 of the barrier coating 420 and an outer surface 442 of the outer protective coating 430. In FIG. 4, the separation 446 of the outer surfaces 442 and 444 forms a gap (e.g., the gap is substantially between 0.1-0.9 centimeters, the gap is between 0.1-0.9 centimeters, the gap is 0.25 centimeters). In other examples, the gap is an air gap between the outer surfaces 442 and 444.

As illustrated in FIG. 4, the food product 300 includes a separation 448 between individual dry particles embedded into the barrier coating. In FIG. 4, the separation 448 between the individual dry particles forms a gap (e.g., the gap is substantially between 0.1-2.1 centimeters, the gap is between 0.1-2.1 centimeters, the gap is 0.95 centimeters). In other examples, the gap is an air gap between the individual dry particles. In some examples, the separation 448 enables air flow (i.e., ventilation) between the individual dry particles, which advantageously enables the cooling of the food product 300 and/or substantially prevents melting of the food product 300. Although FIG. 4 illustrates the separation 448 between the individual dry particles, one or more of the individual dry particles can be positioned substantially next to each other (e.g., the separation is 0.00 centimeters, the separation is 0.01 centimeters).

In other examples, the outer protective coating 430 substantially covers the outer surface 444 of the barrier coating 420 (e.g., covers 99% of the outer surface 444, covers 78% of the outer surface 444, covers 100% of the outer surface 444). In some examples, the plurality of dry particles are embedded into the barrier coating. For example, as illustrated in FIG. 4, the individual dry particles of the outer protective coating 430 are embedded into the barrier coating by various amounts (e.g., 85% embedded into the barrier coating, 99% embedded into the barrier coating, 5% embedded into the barrier coating). In other examples, each of the individual dry particles of the outer protective coating 430 are embedded into the barrier coating by the same amount.

Figure 5:
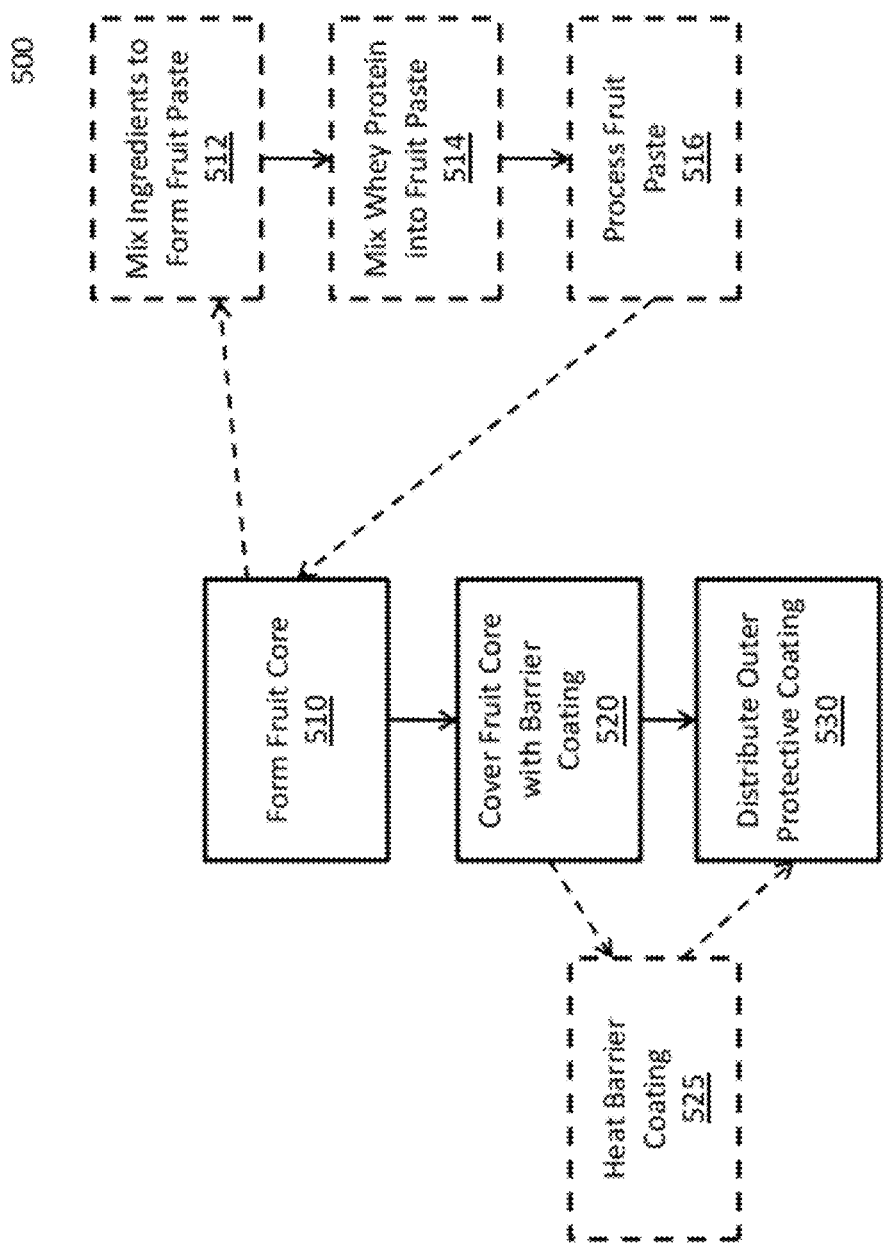
FIG. 5 is a flowchart illustrating an exemplary process for preparing an exemplary ready-to-eat food product, according to an illustrative embodiment of the invention.

FIG. 5 is a flowchart 500 illustrating an exemplary process for preparing an exemplary ready-to-eat food product (e.g., the food product 300 of FIG. 3), according to an illustrative embodiment of the invention, via one or more manufacturing devices (not shown). The process includes forming (510) a fruit core (e.g., the fruit core 310 of FIG. 3). Forming (510) the fruit core can include mixing (512) one or more ingredients (e.g., ground dried fruit, freeze dried fruit powder, fruit juice concentrate, cold water, hot water, steam) to form a fruit paste. Forming (510) the fruit core can further include mixing (514) whey protein into the fruit paste. Forming (510) the fruit core can further include processing (516) the fruit paste to form the fruit core.

The process further includes covering (520) the fruit core (e.g., the fruit core 310 of FIG. 3) with a barrier coating (e.g., the barrier coating 320 of FIG. 3). For example, an enrober (e.g., Baby Flex enrober available from Aasted ApS of Farum, Denmark; enrober available from Baker Perkins Group Ltd. of Peterborough, United Kingdom) enrobes the fruit core with the barrier coating. The process can further include heating (525) the barrier coating before the covering of the fruit core. The process further includes distributing (530) an outer protective coating (e.g., the outer protective coating 330) about the barrier coating.

In some examples, before the covering (520) of the fruit core, the process includes extruding the fruit paste to form the fruit core (e.g., hot extrusion, cold extrusion, warm extrusion). For example, an extruder (e.g., Twin-Screw Extrusion System available from Buhler Inc. of Plymouth, Minn.; extrufood mixing extruder available from Extrufood USA of Rosswell, Ga.) extrudes the fruit paste to form the fruit core. As another example, the extruder extrudes the fruit paste to form fruit cores.

In other examples, the processing (516) of the fruit paste to form the fruit core includes slicing, scoring, cutting, chopping, segmenting, rolling, and/or any other processing of the fruit paste (e.g., shaping, heating, cooling). In some examples, whey protein is mixed into the barrier coating before the fruit core is covered (520) with the barrier coating.

In some examples, the process further includes heating the barrier coating (e.g., 95 degree Celsius, 65 degrees Celsius) before the covering (520) of the fruit core with the barrier coating. In other examples, the process further includes heating the combination of the barrier coating and fruit core (e.g., 60 degree Celsius, 95 degrees Celsius) before the outer protective coating is distributed about the barrier coating. In some examples, the barrier coating is held at a high temperature (e.g., 95 degree Celsius, 75 degrees Celsius) for adherence of the outer protective coating to the barrier coating.

In other examples, the process further includes cooling the food product after the distribution of the outer protective coating to allow the barrier coating to solidify after the heating process (e.g., cooling to 25 degrees Celsius, cooling to 5 degrees Celsius). For example, the food product passes through a cooling tunnel (e.g., cooling tunnel available from Corio Bakery Equipment of Wareham, Mass.; Fedco cooling tunnel available from The Peerless Group of Sidney, Ohio).

In other examples, the process further includes insulating the barrier coating from external heat to substantially limit melting of the barrier coating during handling of the food product. For example, the barrier coating is insulated by the separation of the outer surface of the outer protective coating and the outer surface of the barrier coating. For example, any heat sources (e.g., human hand, warehouse floor) are separated from the barrier coating via the gap formed by the separation of the outer surfaces of the barrier coating and the outer protective coating. As another example, any heat sources are separated from the barrier coating by the outer protective coating, which can have insulating ingredients and/or insulating air pockets.

The food product described herein can include a variety of ingredients. Several examples follow.

EXAMPLE 1

Mixed Fruit Food Product

| Component | Ingredients | Amount per Individual Food Product | Nutritional Value per Individual Food Product |
|---|---|---|---|
| Fruit Core | Natural Dried Apple (dices at 17-21% moisture content) available from Zoria Farms Incorporated of Madera, California | 3.5 grams | 1 milligram of Vitamin C 3 grams of carbohydrates |
| | Strawberry Powder available from Oregon Freeze Dry of Albany, Oregon | 0.5 grams | 0.5 milligrams of Vitamin C |
| | Apple Juice Concentrate | 0.9 grams | 1 milligram of Vitamin C 0.5 grams of carbohydrates |
| | Water | 0.1 gram | Na |
| | Whey Protein | 0.5 grams | 0.25 grams of protein |
| Barrier Coating | Bull's Eye Coating available from | 1.5 grams | 0.5 grams of carbohydrates |

-continued

| Component | Ingredients | Amount per Individual Food Product | Nutritional Value per Individual Food Product |
|---|---|---|---|
| Outer Protective Coating | Blommer Chocolate Company of Union City, California Soy Protein Crisp Rice #618 available from PGP International of Woodland, California | 0.5 grams | 0.75 grams of protein 0.5 grams of carbohydrates |

Example 2

Apple Food Product

| Component | Ingredients | Amount per Individual Food Product | Nutritional Value |
|---|---|---|---|
| Fruit Core | Natural Dried Apple available from Zoria Farms Incorporated of Madera, California | 3.5 grams | 1 milligram of Vitamin C 3 grams of carbohydrates |
|  | Apple Powder available from Oregon Freeze Dry of Albany, Oregon | 0.75 grams | 1 milligram of Vitamin C 0.25 grams of carbohydrates |
|  | Water | 1 grams | Na |
|  | Whey Protein | 0.25 grams | 0.25 grams of protein |
| Barrier Coating | Yogurt Coating available from Blommer Chocolate Company of Union City, California | 1.0 grams | 0.5 grams of carbohydrates |
|  | Whey Protein | 0.75 grams | 0.75 grams of protein |
| Outer Protective Coating | Cereal | 0.5 | 1 gram of carbohydrates |

Example 3

High Protein Food Product

| Component | Ingredients | Amount per Individual Food Product | Nutritional Value |
|---|---|---|---|
| Fruit Core | Natural Dried Cantaloupe (20% moisture content) | 2.5 grams | .5 milligrams of Vitamin C 2 grams of carbohydrates |
|  | Strawberry Powder (15% moisture content) | 1 gram | 1 milligrams of Vitamin C |
|  | Watermelon Juice Concentrate (100% moisture content) | 1 gram | 1.5 milligrams of Vitamin C .5 grams carbohydrates |
|  | Whey Protein (5% moisture content) | 1.5 grams | 1.5 grams of protein |

-continued

| Component | Ingredients | Amount per Individual Food Product | Nutritional Value |
|---|---|---|---|
| Barrier Coating | Milk Chocolate Coating | 1.5 grams | 0.5 grams of carbohydrate |
| Outer Protective Coating | Rice Bran available from PGP International of Woodland, California | 1 gram | 1.0 gram of protein 1.5 grams of carbohydrates |

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A ready-to-eat food product comprising:
   a fruit core consisting of an extruded fruit paste mixture that consists of freeze dried fruit powder, ground dried fruit, fruit juice concentrate, and protein powder;
   a barrier coating covering the fruit core, wherein the barrier coating is a solid or semi-solid up to substantially 41 degrees Celsius; and
   an outer protective coating distributed around the barrier coating, wherein the outer protective coating comprises a plurality of dry particles.

2. The food product of claim 1, wherein the outer protective coating is distributed around the barrier coating to substantially limit melting of the barrier coating during handling of the food product.

3. The food product of claim 2, wherein handling comprises packaging of the food product, consumption of the food product, shipping of the food product, or any combination thereof.

4. The food product of claim 1, wherein the plurality of dry particles are embedded into the barrier coating.

5. The food product of claim 4, wherein the plurality of dry particles are embedded into the barrier coating by various amounts.

6. The food product of claim 1, wherein the fruit product comprises substantially 40-80% fruit core by volume.

7. The food product of claim 1, wherein the barrier coating creates a barrier around the fruit core to maintain moisture content of the fruit core.

8. The food product of claim 1, wherein moisture content of the fruit core is substantially 5% to 25%.

9. The food product of claim 1, wherein at least one of the fruit core, the barrier coating, or the outer protective coating comprising a whey protein or soy protein.

10. The food product of claim 1, wherein the fruit core comprises apple, pear, strawberry, blueberry, mango, pineapple, raspberry, kiwi, banana, orange, lemon, grape, cherry, apricots, cranberry, peach, plum, pomegranate, tangerine, or any combination thereof.

11. The food product of claim 1, wherein the barrier coating comprises chocolate, yogurt, peanut butter, nutritionally fortified coating, confectionary coating, flavored confectionary coating, or any combination thereof.

12. The food product of claim 1, wherein the dry particles comprise crisps, grains, nuts, fruit powders, fruit flakes, cereal, or any combination thereof.

13. A method for preparing a ready-to-eat food product, comprising:
forming fruit cores by extruding a fruit paste mixture, the fruit paste mixture consisting of freeze dried fruit powder, ground dried fruit, fruit juice concentrate, and protein powder;
enrobing the fruit core with a barrier coating, wherein the barrier coating is a solid or semi-solid up to substantially 41 degrees Celsius; and
distributing an outer protective coating around the barrier coating, wherein the outer protective coating comprises a plurality of dry particles.

14. The method of claim 13, further comprising mixing the ground dried fruit, freeze dried fruit powder, fruit juice concentrate, and protein powder to form the fruit paste mixture.

15. The method of claim 14, further comprising processing the fruit paste mixture to form the fruit core, wherein the processing of the fruit paste comprises at least one of slicing, scoring, cutting, chopping, segmenting, or rolling the fruit paste.

16. The method of claim 14, further comprising mixing whey protein or soy protein into the fruit paste.

17. The method of claim 13, further comprising mixing whey protein or soy protein into the barrier coating.

18. The method of claim 13, further comprising mixing whey protein or soy protein into the outer protective coating.

19. The method of claim 13, further comprising heating the barrier coating before the enrobing of the fruit core.

20. The method of claim 13, wherein distributing the outer protective coating around the barrier coating insulates the barrier coating from external heat to substantially limit melting of the barrier coating during handling of the food product.

21. The method of claim 13, wherein moisture content of the fruit core is substantially 5% to 25%.

22. The method of claim 13, wherein moisture content of the fruit core is substantially 21% to 29%.

23. A ready-to-eat food product comprising:
a fruit core consisting of an extruded fruit paste mixture that consists of freeze dried fruit powder, ground dried fruit, fruit juice concentrate, water, and protein powder;
a barrier coating covering the fruit core, wherein the barrier coating is a solid or semi-solid up to substantially 41 degrees Celsius; and
an outer protective coating distributed around the barrier coating, wherein the outer protective coating comprises a plurality of dry particles.

24. The food product of claim 23, wherein the fruit product comprises substantially 40-80% fruit core by volume.

25. A method for preparing a ready-to-eat food product, comprising:
forming fruit cores by extruding a fruit paste mixture, the fruit paste mixture consisting of freeze dried fruit powder, ground dried fruit, fruit juice concentrate, water, and protein powder;
enrobing the fruit core with a barrier coating, wherein the barrier coating is a solid or semi-solid up to substantially 41 degrees Celsius; and
distributing an outer protective coating around the barrier coating, wherein the outer protective coating comprises a plurality of dry particles.

26. The method of claim 25, wherein the food product comprises substantially 40-80% fruit core by volume.

* * * * *